UNITED STATES PATENT OFFICE.

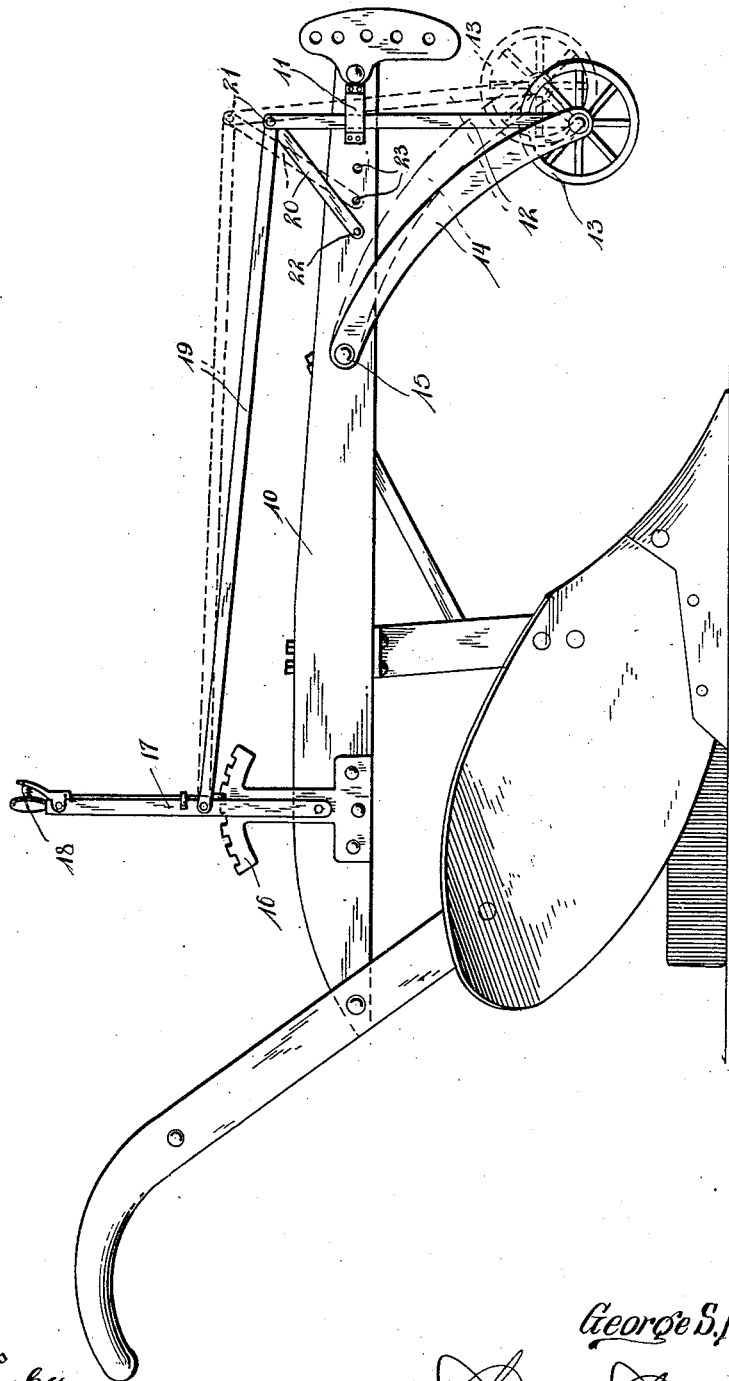

GEORGE S. McDONALD, OF WESSINGTON SPRINGS, SOUTH DAKOTA.

GAGE-WHEEL STRUCTURE.

1,071,450. Specification of Letters Patent. Patented Aug. 26, 1913.

Application filed March 20, 1911. Serial No. 615,642.

*To all whom it may concern:*

Be it known that I, GEORGE S. MCDONALD, a citizen of the United States, residing at Wessington Springs, in the county of Jerauld, State of South Dakota, have invented certain new and useful Improvements in Gage-Wheel Structures; and I do hereby declare the following to be a full, clear, and exact description of the invention, such as will enable others skilled in the art to which it appertains to make and use the same.

This invention relates to gage attachments for agricultural implements and has for an object to provide an attachment of this character that will permit of a more accurate adjustment of the gage wheel than usual.

To this end the invention resides specifically in the novel construction of a movable fulcrum for the gage wheel actuating lever mechanism and more generally in the novel details of construction and combinations of parts hereinafter fully described and claimed.

In the accompanying drawing forming part of this specification, the figure is a side elevation of a plow equipped with my improved gage attachment.

Referring now to the drawing by reference numerals, 10 designates in general an ordinary plow. Fixed to one side of the beam is a strap eye 11, and loosely engaged through this eye is a bar 12 the lower end of which is equipped with a revoluble gage wheel 13. A curved standard 14 is loosely connected at one end to the axle of the wheel, and at its opposite end is pivotally secured to the plow beam by means of a single bolt 15 or the like. Fixed to the heel end of the plow beam is a notched segment 16, upon one side of which is pivoted an operating lever 17 having a pivoted spring pressed latch 18 which engages the notches in the segment. A draw bar 19 is pivotally connected at one end to the intermediate portion of the lever and is pivotally connected at its opposite end to the upper end of the bar 12 above the plow beam. A fulcrum link 20 is loosely connected to the intersecting ends of the draw rod and bar, connection between the three parts being preferably made by means of a single pivot bolt 21. The opposite end of the fulcrum link is pivotally secured to the plow beam through the instrumentality of a pivot pin 22, and formed in the plow beam are alined series of openings 23 designed to receive the pivot pin of the fulcrum link so that the fulcrum link may be adjusted lengthwise of the plow beam to assume a more upright or more inclined position than ordinary.

In breaking up new ground, various thicknesses of sod are encountered, and by actuating the handle lever 17 while the plow is in motion, the bar 12 may be raised or lowered thereby raising or lowering the gage wheel so that the plow point enters to the desired working depth into the soil. Should abnormal conditions of soil be encountered, and when it is desired to effect a deeper penetration of the plow point than would be possible with the parts shown in the position illustrated in full lines in the figure, it will simply be necessary to remove the pivot bolt of the fulcrum link and adjust this link so as to assume a more vertical position by moving the link bodily forward upon the beam, and when this adjustment is effected the pivot bolt is again inserted in one of the openings in advance of the previous position of the pivot bolt. The gage wheel in this new position of the fulcrum link will be held closer to the plow beam so that the plow point will sink deeper into the soil. By now actuating the handle lever, the gage wheel may be elevated or depressed while the plow is in motion to conform to irregularities in the soil. It will thus be seen that by virtue of the fulcrum link being adjustably secured to the plow beam, a more accurate adjustment of the gage wheel to conform to various conditions of soil may be made than usual.

What is claimed, is:—

1. A gage-wheel structure, comprising a forwardly and downwardly extended standard pivoted at its upper end to a plow beam, a wheel journaled at the lower end of the standard, a bar pivoted at its lower end to the wheel axle, said bar extending above the plow beam, means for preventing lateral movement of the bar, a link pivoted to the upper end of the bar and having its lower end pivotally connected to the beam forwardly of the pivot of the standard, the beam being provided with means for adjusting the pivot of the link, and a draw bar connected to the pivot of the link and bar, and means for holding the draw bar in an adjusted position.

2. A gage-wheel structure, comprising a forwardly and downwardly extended standard pivoted at its upper end to a plow beam, a wheel journaled at the lower end of the standard, a bar pivoted at its lower end to the wheel axle, said bar extending above the plow beam, means for preventing lateral movement of the bar, a link pivoted to the upper end of the bar, the beam being provided forwardly of the pivot of the standard with a series of longitudinally spaced openings, a pin engaged in an opening and pivotally connecting the lower end of the link to the beam, said pin being capable of adjustment to any one of the openings of the series, and a draw bar connected to the pivot of the link and bar, and means for holding the draw bar in an adjusted position.

In testimony whereof, I affix my signature, in presence of two witnesses.

GEORGE S. McDONALD.

Witnesses:
HENRY HENDRICKSON,
JESSE E. CRESS.

Copies of this patent may be obtained for five cents each, by addressing the "Commissioner of Patents, Washington, D. C."